United States Patent [19]
Prociw

[11] Patent Number: 6,125,624
[45] Date of Patent: Oct. 3, 2000

[54] ANTI-COKING FUEL INJECTOR PURGING DEVICE

[75] Inventor: Lev Alexander Prociw, Elmira, Canada

[73] Assignee: Pratt & Whitney Canada Corp., Longueuil, Canada

[21] Appl. No.: 09/061,278

[22] Filed: Apr. 17, 1998

[51] Int. Cl.[7] ...................................................... F02G 3/00
[52] U.S. Cl. ......................................................... 60/39.094
[58] Field of Search .......................................... 60/39.094

[56] References Cited

U.S. PATENT DOCUMENTS

| | | |
|---|---|---|
| 3,344,602 | 10/1967 | Davies et al. . |
| 3,541,788 | 11/1970 | Schutz . |
| 4,095,418 | 6/1978 | Mansson et al. . |
| 4,215,549 | 8/1980 | Daeschner . |
| 4,464,901 | 8/1984 | Kobayashi et al. . |
| 4,517,802 | 5/1985 | Kobayashi et al. . |
| 5,528,897 | 6/1996 | Halin .................................... 60/39.064 |
| 5,701,732 | 12/1997 | Nesbitt et al. ........................ 60/39.094 |

FOREIGN PATENT DOCUMENTS

| | | |
|---|---|---|
| 3916477 | 5/1989 | Germany . |
| 60-164627 | 2/1984 | Japan . |
| 164627 | 8/1985 | Japan .................................. 60/39.094 |

*Primary Examiner*—Charles G. Freay
*Attorney, Agent, or Firm*—Jeffrey W. Astle

[57] ABSTRACT

The invention relates to an air purge system for preventing coke buildup in gas turbine engine fuel injectors, and in particular in the relatively small orifice pressure atomizers of a primary fuel injector. The inventors have recognized that after engine shutdown, residual engine heat is sufficient to cause fuel on wetted surfaces of the injectors to decompose and deposit coke. Especially critical are small orifices in injectors positioned towards the upper side of an engine, since rising hot gases accumulate and heat the upper engine area significantly for a long period after engine shutdown. Coke buildup leads to narrowing of the fuel injector orifices, and without adequate maintenance leads to uneven burning and eventually can incapacitate the engine. Fuel injectors are often located in relatively inaccessible interior portions of the engine. Extending the service life of an injector can result in significant maintenance cost savings and engine downtime. The air purge system is activated on engine shutdown to continuously exhaust cooling air through the injector orifices for an extended purge period after shutdown, for example 1–1.5 hours. A battery operated air blower connected to the fuel line forces cooling air through the injector until a thermocouple switch deactivates the blower on sensing an injector temperature below 150° F. At this low temperature, coke formation does not occur and during engine operation efficient combustion minimizes coke formation. The invention provides the following benefits: (1) fuel is completely purged over an extended period from the injector; (2) backflow of combustion gases into the injector is impeded by continuous positive pressure and air flow out of the injector; (3) the fuel wetted surfaces of the injectors are more completely dried after long term exposure to purging air flow; and (4) the injectors are air cooled after engine shutdown to maintain injector temperature below the temperature at which coke formation will occur.

9 Claims, 1 Drawing Sheet

ANTI-COKING FUEL INJECTOR PURGING DEVICE

TECHNICAL FIELD

The invention relates to an air purge system for preventing coke buildup in gas turbine engine fuel injectors, and in particular in small orifice pressure atomizers of a primary fuel injector.

BACKGROUND OF THE ART

The inventor has recognized that after engine shutdown, residual engine heat is sufficient to cause fuel on wetted surfaces of the injectors to decompose and deposit coke.

Coke buildup leads to narrowing of the fuel injector orifices. Without adequate maintenance coking results in uneven burning and eventually can incapacitate the engine. Fuel injectors are often located in relatively inaccessible interior portions of the engine. Extending the service life of an injector can result in significant maintenance cost savings and reduced engine downtime.

Especially critical are small orifices in injectors positioned towards the upper side of an engine, since rising hot gases accumulate and heat the upper engine area significantly for a long period after engine shutdown. The inventor observed that coke buildup occurred to a much greater degree in the upper areas of the engine and consequently recognized the cause was hot gas accumulation after engine shutdown at temperatures sufficient to result in fuel decomposition and subsequent coke accumulation.

This problem has not been generally recognized in the prior art, and specifically the effect of hot gas accumulation in the upper areas of the engine after shutdown has not been appreciated. Several injector purging systems are present in the prior art, however, these systems provide for air purging of fuel from the injectors and scavenging of fuel from fuel manifolds on engine shutdown.

The prior art does not appear to contemplate the state of fuel wetted surfaces after shutdown. Possibly it has been presumed that any fuel will quickly evaporate, with no significant side effect. For example, U.S. Pat. No. 3,541,788 to Schultz provides a system for scavenging fuel from liquid fuel nozzles on shutdown, and U.S. Pat. No. 4,095,418 to Mansson et al provides a system to flush or purge fuel from injectors with compressed air. In both cases a stop valve is activated on shutdown to prevent fuel from escaping into the engine from the injectors. Prior art systems relate only to recovery of fuel from the interior of the injector nozzles. No consideration is given to fuel wetted injector surfaces in communication with hot combustion chamber gases.

Another prior art example is U.S. Pat. No. 3,344,602 to Davies et al which provides a fuel purging system for gas turbine engine injectors which expels residual fuel from the injectors with compressed air. It is specifically noted therein (at Col 2 lines 20–28) that during purging, the decelerating engine compressor and turbine rotors remain rotating to provide sufficient air flow through the engine to discharge the expelled/purged fuel from the combustion zones of the engine.

Recommended operation of a gas turbine engine includes allowing the engine to cool during an idling period before complete engine shutdown. In practice however, pilots especially of small aircraft, often do not allow the engines to idle since cargo access and passenger egress are not safely conducted while the engine idles.

No consideration is given in the prior art to what happens later to fuel wetted injector surfaces. Air flow through the engine diminishes as the engine rotors gradually cease rotating. The metal components of the engine and especially the combustion chamber remain hot for up to one hour after engine shutdown. Heat from these engine areas eventually dissipates through convection into the surrounding metal engine structure and through heat exchange with relatively static air in the engine.

Engine components surrounding the combustion chamber serve as insulation to retain heat and prevent air circulation. Air flow through an operating gas turbine engine is directed axially and all engine structures are designed to minimize resistance to axial air flow. However, when the rotors cease rotating, axial air flow ceases and hot air in the engine rises to the upper portions of the engine, where it is trapped. Hot air is produced on contact with the hot engine components, and together with convection through the metallic engine structure, eventually dissipates the heat from the combustion chamber. During the period immediately after engine shutdown, trapped hot air in the upper portions of the combustion chamber prevents rapid cooling of this portion of the combustion chamber.

The combination of fuel wetted injector surfaces and heat retention in the adjacent combustion chamber results in fuel decomposition and coke buildup. Temperatures of up to 250° F. have been measured after shutdown in the upper areas of the combustion chamber. At this elevated temperature coking can occur.

During engine operation, the passing of fuel through the interior of the injectors and air flow over the exterior of the injectors provide an efficient cooling system for the injectors and coke does not form during operation to any significant extent. However, after engine shutdown, the injectors are not cooled in conventional systems. The trapped hot air accumulating in the upper areas of the combustion chamber is sufficient to heat the injectors to a temperature such that fuel on wetted surfaces decomposes to form a layer of coke. Coke formation is especially detrimental where very narrow orifices are used and coke layers in the order of a few thousandths of an inch can result in measurable decreases in fuel efficiency.

DISCLOSURE OF THE INVENTION

The air purge system of the invention is activated on engine shutdown to continuous exhaust cooling air through the injector orifices for an extended purge period after shutdown, for example 1 to 1.5 hours.

A battery operated air blower connected to the fuel line forces cooling air through the injector until a thermocouple switch deactivates the blower on sensing an injector temperature below 150° F. At this lowered temperature, coke formation does not occur. During engine operation efficient combustion and injector cooling minimizes coke formation.

The invention provides the following benefits:

(1) fuel is completely purged over an extended period from the injector;

(2) backflow of hot combustion gases into the injector is impeded by continuous positive pressure and air flow out of the injector;

(3) the fuel wetted surfaces of the injectors are more completely dried after long term exposure to purging air flow; and (4) the injectors are air internally cooled after engine shutdown to maintain injector temperature below the temperature at which coke formation will occur.

Specifically the invention provides, in a gas turbine engine comprising an intake air compressor upstream of a combustion chamber including at least one fuel injector supplied with liquid fuel from a fuel line, wherein the improvement comprises:

an anti-coking fuel injector purging device comprising: air purge means, connected to the fuel line and a cooling air source, for continuously exhausting cooling air through the fuel orifices during a selected purging period commencing upon engine shutdown; engine shutdown sensor switch means for activating the air purge means on sensing engine shutdown; and purge termination switch means for deactivating the air purge means on sensing an injector temperature below a selected allowable temperature.

Further details of the invention and its advantages will be apparent from the detailed description and drawing included below.

BRIEF DESCRIPTION OF THE DRAWINGS

In order that the invention may be readily understood, one preferred embodiment of the invention will be described by way of example, with reference to the accompanying drawing wherein.

DETAILED DESCRIPTION OF PREFERRED EMBODIMENTS

Figure 1:
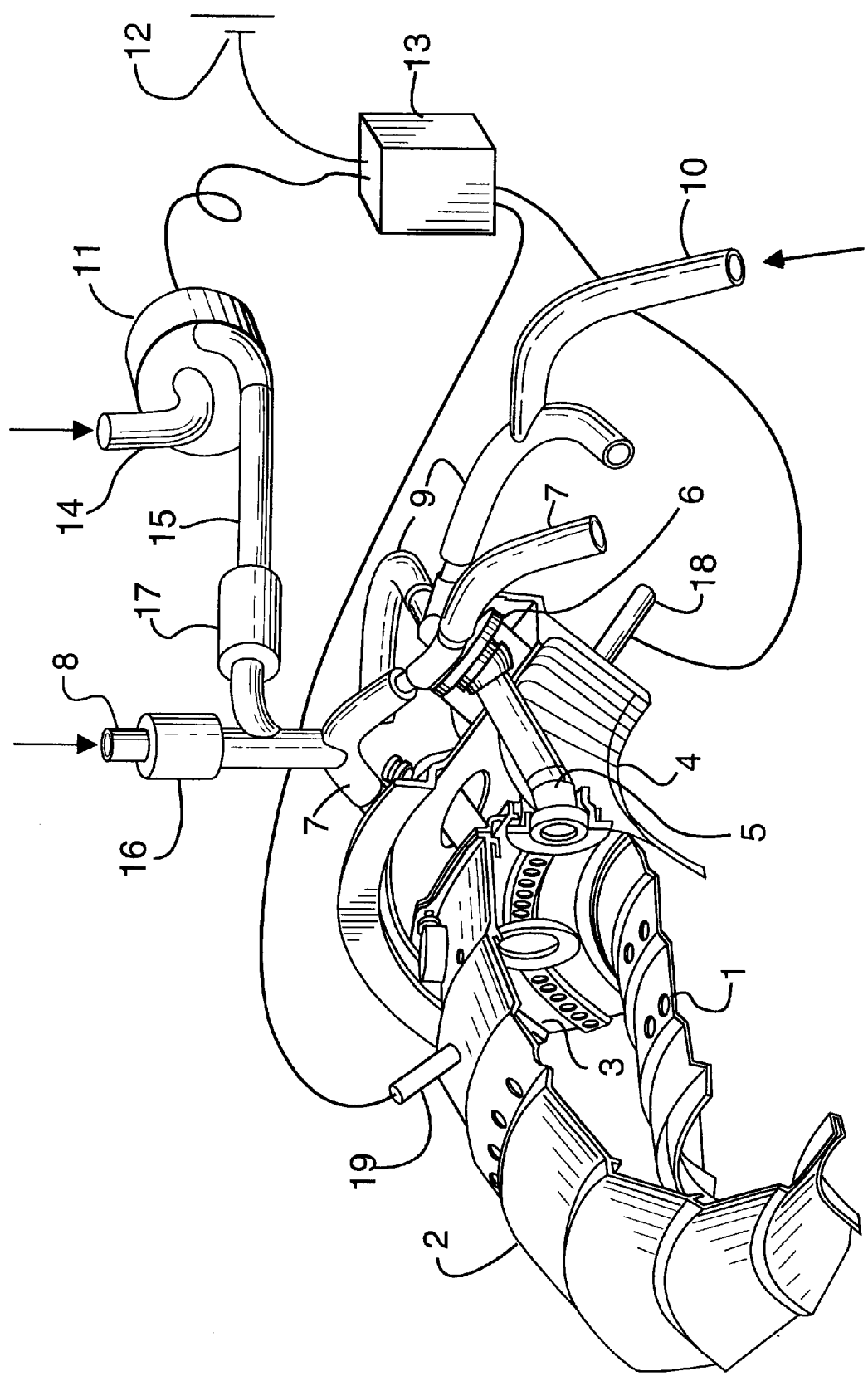
FIG. 1 is a cutaway perspective view of a segment of an annular gas turbine engine combustion chamber particularly showing a fuel injector with primary and secondary fuel manifolds and fuel lines, the anti-coking device being connected to the primary fuel line with check valves, air blower, battery powered control unit, pressure sensor (purge start) switch mounted to the combustion intake duct, and a thermocouple (purge stop) switch mounted to the outer wall of the combustion chamber.

FIG. 1 shows a cut away prospective view of segment of an annular gas turbine engine combustion chamber with associated fuel injectors. The reverse flow combustion chamber is defined between an inner plate 1 and outer plate 2 and an end wall 3. Axial compressed air flow from the engine compressors passes over the interior surface of duct plate 4. A conventional fuel injector 5 is mounted through the end wall 3 and supported on the duct plate 4 with an injector base 6.

In the embodiment shown, the fuel injector 5 includes primary fuel orifices (not shown) fed by a primary fuel manifold 7 which circles around the engine connecting the fuel injector bases 6 of a circumferential ring of like injectors 5. The primary fuel manifold 7 is supplied with liquid fuel through the primary fuel line 8 as indicated is by the arrow in FIG. 1.

In a like manner the fuel injector 5 includes secondary fuel orifices (not shown) supplied by a secondary fuel manifold 9 and a secondary fuel line 10. The primary fuel orifices are of a lesser size relative to the secondary fuel orifices as in conventional. In the embodiment shown, the anti-coking fuel injector purging device communicates only with the primary fuel line 8. However, it will be understood that the invention may also be applied to the secondary fuel line 10 as well. It is anticipated however, that the most benefit for the least expenditure can be provided by inserting the anti-coking device in the primary fuel line 8. The size of primary fuel orifices is relatively small and the effect of a thin layer of coke on such narrow orifices is more significant than the same thickness layer on a larger secondary orifice. As well, the small primary orifices, associated primary manifold 7 and primary fuel line 8 require relatively low volumes of compressed air to accomplish the purposes of the invention. The much larger secondary fuel system would require much larger volumes of compressed air to accomplish the same purpose. However, the decision to apply the invention to a secondary fuel line is a matter of design choice and not a limitation on the scope of the invention.

Refering to the anti-coking fuel injector purging device itself, FIG. 1 illustrates one embodiment of the device which includes an air purge blower 11. The blower 11 is electrically powered with a battery 12 via a junction box 13. The blower 11 has an intake 14 connected to a source of cooling air, from outside the engine for example. The pressurized air output from the blower 11 is conducted to the fuel line 8 via a compressed air conduit 15. A purge check valve 16 is positioned in the primary fuel line 8 to inhibit back flow of compressed cooling air upstream in the fuel line 8. The compressed air conduit 15 also includes a fuel check valve 17 disposed between the air purge blower 11 and the fuel line 8 to inhibit back flow of fuel into the air purge blower 11.

In operation therefore, the blower 11 continuously exhausts cooling air through the compressed air conduit 15, through the primary fuel line 8, to the primary fuel manifold 7, injector bases 6 and out through the primary fuel orifices of each fuel injector 5. Commencing upon engine shut down, a purging period of a selected duration begins and continues for an extended time. The duration of the purging period can be preprogrammed into the control system.

Controls include an engine shut down sensor switch 18 which activates the blower 11 on sensing engine shut down. Various electronic or mechanical sensors switches can be used, however, in the embodiment shown, the shut down switch 18 is an engine air pressure sensor switch. When the engine is operating the compressed air from the compressor section is ducted over the duct plate 4. The engine air pressure sensor switch 18 powered by the battery 12 activates the blower 11 on sensing that the air pressure in the engine drops below a selected operating air pressure. Reduction in air pressure is a reliable indicator of engine shut down, however, there are other indicators which can be used and are known to those skilled in this art.

The blower 11 will continuously exhaust cooling air through the primary fuel orifices of the fuel injectors 5 until it receives a deactivation signal. A purge termination switch 19 connected to the junction box 13 provides a deactivation signal in the form of a break in the circuit between the battery 12 and blower 11 on sensing an injector temperature below a selected allowable temperature. The purge termination switch can comprise a thermocouple mounted to the combustion chamber 2. The temperature sensed by the thermocouple 19 on the combustion chamber wall 2 will be proportional to the injector temperature. Thermocouples 19 can also be placed on the injector 5 itself or any adjacent structure which will provide a reasonably accurate estimation of the injector temperature. It has been estimated that the allowable temperature if set at 150° F. will be sufficient to prevent significant depositing of coke in the injector 5 and its fuel atomizing orifices. Any temperature range setting however, can be determined depending on the choice of the designer.

It will be understood that the above description relates to a simple anti-coking fuel injector purging device. Further enhancements may be provided within the scope of the invention disclosed. For example, the junction box 13 may be replaced with a more sophisticated control unit allowing the pilot or maintenance personnel to have direct control over the purging operation. As well, several sensor switches 18 and 19 may be placed throughout the combustion chamber and engine to provide a more accurate reading.

Although the above description and accompanying drawings relate to a specific preferred embodiment as presently contemplated by the inventor, it will be understood that the invention in its broad aspect includes mechanical and functional equivalents of the elements described and illustrated.

What is claimed is:

1. An anti-coking fuel injector purging device for a gas turbine engine, which includes an intake air compressor upstream of a combustion chamber including at least one fuel injector having fuel injector orifices supplied with liquid fuel from a fuel line, the anti-coking fuel injector purging device comprising:

air purging means adapted to connect to the fuel line and a cooling air source for continuously exhausting cooling air through the fuel injection orifices during a selected purging period commencing upon engine shutdown;

engine shutdown sensor switch means for activating the air purge means on sensing engine shutdown; and purge termination switch means for deactivating the air purge means on sensing an injector temperature below a selected allowable temperature.

2. An anti-coking device according to claim 1 further including:

purge check valve means adapted for connection with the fuel line for inhibiting backflow of cooling air upstream in the fuel line.

3. An anti-coking device according to claim 1 further including:

fuel check valve means adapted for connection between the air purge means and the fuel line for inhibiting backflow of fuel into the air purge means.

4. An anti-coking device according to claim 1 wherein the engine shutdown sensor switch means comprises an engine air pressure sensor switch.

5. An anti-coking device according to claim 1 wherein the purge termination switch means comprises a thermocouple switch in communication with the combustion chamber.

6. An anti-coking device according to claim 5 wherein the allowable temperature is 150° F.

7. An anti-coking device according to claim 1 wherein the air purge means comprises an air blower.

8. An anti-coking device according to claim 1 wherein: the air purge means comprises an air blower, the engine shutdown sensor switch means comprises an engine air pressure sensor switch, and the purge termination switch means comprises a thermocouple switch in communication with the combustion chamber; and wherein the blower, pressure sensor switch and thermocouple switch are powered by an electric battery.

9. An anti-coking device according to claim 8 wherein, in an engine where each fuel injector includes primary and secondary fuel orifices fed by primary and secondary fuel lines respectively and the primary fuel orifices are of lesser size relative to the secondary fuel orifices; the an anti-coking fuel injector purging device is adapted to communicate with the primary fuel line.

* * * * *